United States Patent
Fu et al.

(10) Patent No.: US 9,410,059 B2
(45) Date of Patent: Aug. 9, 2016

(54) WAX TREATED ARTICLE AND METHOD OF MAKING

(71) Applicant: Ridley USA Inc., Mankato, MN (US)

(72) Inventors: Chunjiang Fu, North Mankato, MN (US); Wajira Asanga Ratnayake Manamperi, Madelia, MN (US); Dan Dhuyvetter, Saint Peter, MN (US)

(73) Assignee: Alltech, Inc., Nicholasville, KY (US)

( * ) Notice: Subject to any disclaimer, the term of this patent is extended or adjusted under 35 U.S.C. 154(b) by 354 days.

(21) Appl. No.: 14/160,065

(22) Filed: Jan. 21, 2014

(65) Prior Publication Data
US 2015/0203719 A1  Jul. 23, 2015

(51) Int. Cl.
| | |
|---|---|
| *C09D 101/06* | (2006.01) |
| *B27N 5/02* | (2006.01) |
| *B27N 7/00* | (2006.01) |
| *C09D 191/06* | (2006.01) |
| *C09D 191/08* | (2006.01) |

(52) U.S. Cl.
CPC ............ *C09D 191/06* (2013.01); *B27N 5/02* (2013.01); *B27N 7/00* (2013.01); *C09D 191/08* (2013.01); *Y10T 428/13* (2015.01)

(58) Field of Classification Search
CPC ........... C09D 101/06; B27N 5/02; B27N 7/00
USPC ................... 426/307, 138; 427/443
See application file for complete search history.

(56) References Cited

U.S. PATENT DOCUMENTS

| | | | | |
|---|---|---|---|---|
| 3,635,193 A | * | 1/1972 | Stease | D21H 23/68 118/324 |
| 4,826,714 A | * | 5/1989 | King | D21H 23/68 229/5.85 |
| 4,957,754 A | * | 9/1990 | Munk | A21D 13/0029 426/138 |
| 5,374,474 A | | 12/1994 | Pratt et al. | |
| 5,437,722 A | * | 8/1995 | Borenstein | C04B 28/14 106/270 |
| 5,837,371 A | | 11/1998 | Rivas | |
| 6,337,097 B1 | * | 1/2002 | Sun | A23K 1/001 426/102 |
| 6,561,787 B2 | | 5/2003 | Sun et al. | |
| 6,716,022 B2 | | 4/2004 | Sun et al. | |
| 6,811,824 B2 | * | 11/2004 | Hassan | D21H 19/18 106/220 |
| 7,399,438 B2 | | 7/2008 | Clark et al. | |
| 7,435,369 B2 | | 10/2008 | Hennis et al. | |
| 7,980,450 B2 | * | 7/2011 | Swoboda | A47G 19/03 229/406 |
| 2006/0255507 A1 | | 11/2006 | Bowden et al. | |
| 2008/0265222 A1 | | 10/2008 | Ozersky et al. | |
| 2012/0315362 A1 | * | 12/2012 | Dale | B65D 65/466 426/138 |
| 2013/0149930 A1 | * | 6/2013 | Echt | B32B 33/00 442/59 |

* cited by examiner

*Primary Examiner* — Cachet Sellman
(74) *Attorney, Agent, or Firm* — Kilyk & Bowersox, P.L.L.C.; Valerie Calloway

(57) ABSTRACT

Water swellable articles are treated with wax by applying a molten wax to the article, the wax having a kinematic viscosity of between about 0.1 cSt to 20 cSt at 100° C., wherein the temperature of the article at the time of applying is about 40° C. to 200° C., with the proviso that the temperature is not less than 30° C. below the melting point of the wax. Using this method of treatment, swelling of the article in water is reduced by at least 25% compared to the same article treated with molten wax wherein the article is at ambient temperature at the time the wax is applied.

14 Claims, 5 Drawing Sheets

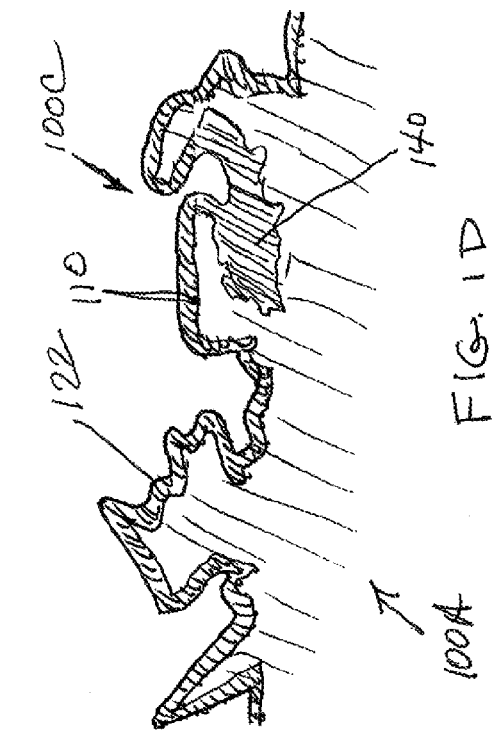
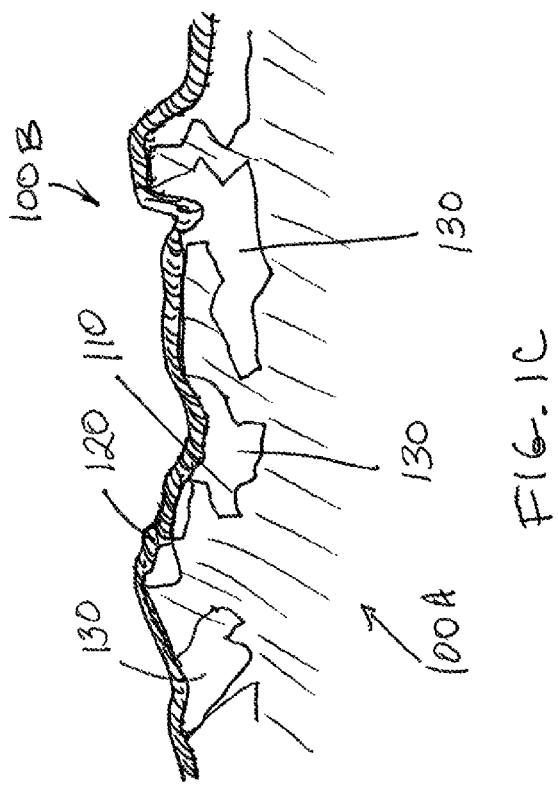

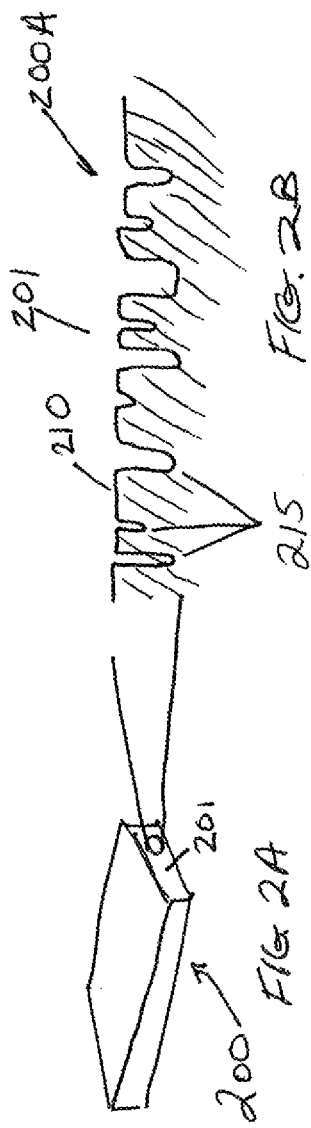
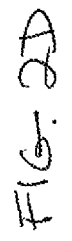
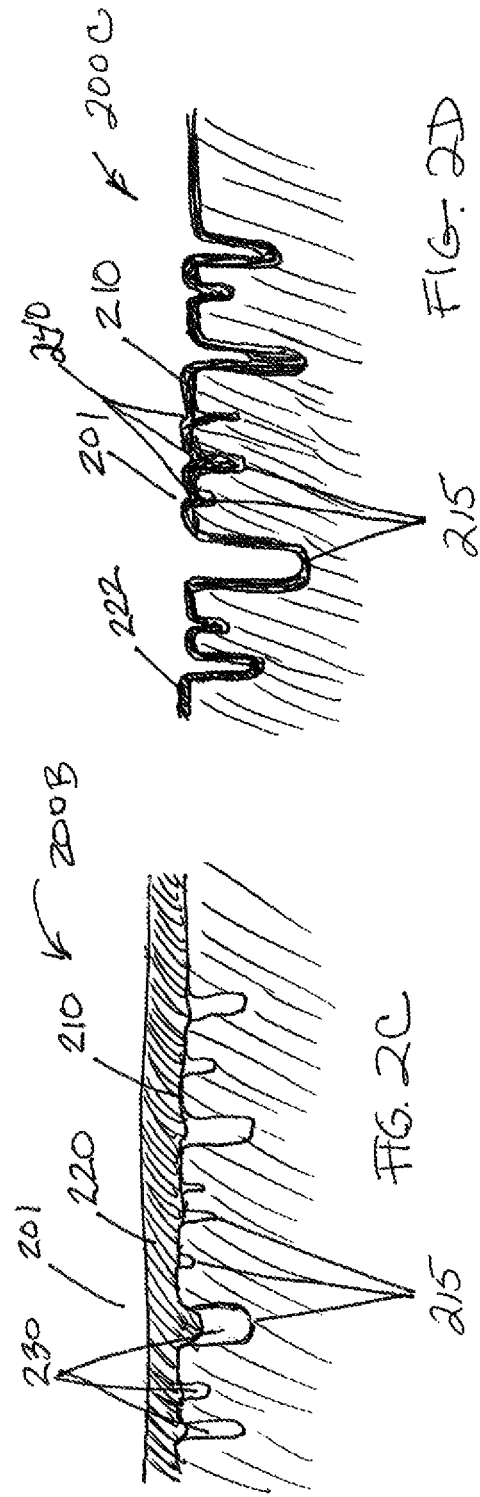

WAX TREATED ARTICLE AND METHOD OF MAKING

TECHNICAL FIELD

This application relates to methods of impregnating water-absorptive articles with wax materials for the purpose of forming highly water resistant and weather resistant articles, and articles formed using the methods.

BACKGROUND

Articles or materials are often employed in applications where a substantial amount of water is encountered, wherein the water is deleterious in the application because the article or material absorbs the water and swells. For example, particleboard is known by those of skill to be highly water absorptive, swelling to a large degree and sometimes becoming permanently deformed even upon subsequent drying; yet particleboard is often employed underneath formica countertops for kitchens, in items of furniture, or underneath carpeting due to its low cost. Encroachment of water, typically by accidental spills of water or aqueous liquids, causes countertops to bulge noticeably after a spill happens near a seam in the countertop; causes a noticeable permanent bump or lump after a spill happens over a carpeted area; or causes a permanent deformation, bump, mark, or all of these in an item of furniture where a spill contacts the particleboard feature such as a laminated particleboard surface or even an exposed particleboard surface (e.g. the back of a bookcase). Treatments to make particleboard water resistant or waterproof are available, however such treatments add considerable cost to the product, nullifying the cost advantages of using the particleboard in the first place. Polyurethane or epoxy coatings, for example, can be used. An inexpensive method of imparting substantially increased water resistance to particleboard would be highly desirable in the industry.

Increasingly, compostable, biodegradable, and/or edible articles are produced as environmentally sound replacement articles for what traditionally was the purview of petroleum-based plastics. For example, biodegradable disposable comestible containers, utensils, and the like are increasingly being adopted for use in fast food or cafeteria type applications or for home use. Such containers, utensils, and the like are often formed with the inclusion of biopolymers such as starches, cellulose, recycled wood fibers or particles, and the like. However, many biologically sourced polymers are water sensitive and absorb a sufficient volume of water, upon exposure thereto, that integrity of the item is lost and utility destroyed. Recognition of this problem has given rise to the use of materials such as starch blended with or grafted to a polymer that is not biodegradable, such as polyethylene or polypropylene, in order to maintain an acceptable degree of water resistance for the envisioned application. Thus, such articles can only claim a percentage of biodegradable or compostable content. An inexpensive method of imparting substantially increased water resistance to such articles that does not include addition of environmentally harmful materials, non-biodegradable materials, or materials that would be harmful for people to ingest would enable the increased percentage of biodegradable or compostable content use in such articles, and perhaps even provide for 100% biodegradable or compostable content in some applications.

Biodegradable or compostable containers for outdoor use are another set of articles that are produced as environmentally responsible replacement articles for what traditionally was the purview of petroleum-based plastics. Sun et al., U.S. Pat. No. 6,337,097 describe a biodegradable and edible feed container for use with livestock feed materials, wherein a mixture of edible fibers derived from e.g. straw, corn husks, sorghum stalks, soybean hulls, or peanut hulls are compressed and heated with a biologically derived adhesive, such as soy flour adhesive. The containers are not water resistant and thus swell when placed in e.g. muddy fields or areas with standing water. An inexpensive method of imparting substantially increased water resistance to such articles that does not include addition of environmentally harmful or non-biodegradable materials or materials that would be harmful for livestock to ingest would increase the scope of utility for such articles in outdoor applications.

Bowden et al., U.S. Patent Appl. Publication No. 2006/0255507, disclose biodegradable containers for holding food products in dry, damp, or wet conditions wherein starch suspensions are mixed with wood fibers or wood flour; wherein a wax, fatty alcohol, or phospholipid in the mixture is added to the mixture and the mixture is heated to form the container.

Pratt et al., U.S. Pat. No. 5,374,474, disclose blending recycled paper fibers with an isocyanate resin and up to 2% of a wax, then heating and compressing the blend to yield a water-resistant board.

Ozersky et al., U.S. Patent Appl. Publication No. 2008/0265222, disclose surface modified cellulose-containing fibers that include wax as a hydrophobizing agent, and paper products formed using the modified fibers used as fillers.

Clark et al., U.S. Pat. No. 7,399,438, disclose a method of producing thin layer lignocellulosic composites by combining lignocellulosic fibers, an organic isocyanate resin, and a wax, and pressing the mixture at elevated temperature and pressure to form a mat that exhibits good moisture resistance.

Hennis et al., U.S. Pat. No. 7,435,369, disclose a method of manufacture of multilayer gypsum board that includes delivering a wax emulsion additive impregnated in a thin sheet of randomly aligned inorganic fibers to encase the core gypsum within facing layers of the multilayer board.

Rivas, U.S. Pat. No. 5,837,371, discloses a process for coating acrylic fibers in which an acrylic yarn is immersed in an aqueous bath containing a polyethylene, a low melting paraffin wax emulsion, and a high melting paraffin wax emulsion; followed by raising the temperature of the bath, to sequentially coat the fibers of the yarn with the polyethylene, the low melting paraffin wax emulsion, and the high melting paraffin wax emulsion respectively.

SUMMARY

Disclosed herein is a method of treating an article, the method including applying a molten wax to the article, the wax having a kinematic viscosity of between about 0.1 cSt and 20 cSt at 100° C. according to ASTM D445 (or, for a wax having a density of 1 g/cm$^3$, dynamic viscosity between about 0.1 cP and 20 cP at 100° C.), wherein the temperature of the article at the time of applying is about 40° C. to 200° C., with the proviso that the temperature is not less than 30° C. below the melting temperature of the wax; and solidifying the applied wax.

Also disclosed herein is a method of treating a water swellable article, the method including applying a molten wax to the article, the wax having a melting point of about 50° C. to 90° C. and a kinematic viscosity of between about 0.1 cSt and 20 cSt at 100° C. according to ASTM D445 (or, for a wax having a density of 1 g/cm$^3$, dynamic viscosity between about 0.1 cP and 20 cP at 100° C.) wherein the temperature of the article at the time of applying is not more than about 10°

C. less than the melting point of the wax; and cooling the article to a temperature below the melting point of the wax.

Also disclosed herein is a method of treating a water swellable article, the method including applying a molten wax to the article, the wax having a melting point of about 70° C. to 90° C., and a kinematic viscosity of between about 0.1 cSt and 20 cSt at 100° C. according to ASTM D445 (or, for a wax having a density of 1 g/cm$^3$, dynamic viscosity between about 0.1 cP and 20 cP at 100° C.) wherein the temperature of the article at the time of applying is not more than about 30° C. less than the melting point of the wax; and cooling the article to a temperature below the melting point of the wax.

Also disclosed herein is method of making a container, the method including: placing a fiber mixture in a mold, the fiber mixture comprising a fiber and a binder, the fiber and the binder being biodegradable, edible, or both; forming a self-supporting container by application of heat and pressure to the fiber mixture in the mold; removing the container from the mold; applying a molten wax to the container, the wax having a melting point between about 70° C. and 90° C. and a kinematic viscosity of between about 0.1 cSt and 20 cSt at 100° C. according to ASTM D445 (or, for a wax having a density of 1 g/cm$^3$, dynamic viscosity between about 0.1 cP and 20 cP at 100° C.), wherein the temperature of the container at the time of applying is about 40° C. to 200° C., with the proviso that the temperature is not less than 30° C. below the melting temperature of the wax; and solidifying the wax.

Also disclosed herein is a treated article including an article and a wax, the article including one or more biodegradable materials, edible materials, or biodegradable and edible materials; wherein the treated article swells at least 25% less in water than the article, measured as the difference in wt % water pickup between the article and the treated article. In some embodiments, the article swells at least 100 wt % when immersed in water at a temperature of about 20° C. to 22° C. after about 5 to 200 minutes and the treated article swells less than 75% by weight under the same conditions. In some embodiments, the treated article swells about 25% to 200% less than the article.

Also disclosed herein is a treated article including a water swellable article and a wax, wherein the treated article is treated by applying the molten wax to the article, followed by solidifying the wax, the wax having a melting point of about 50° C. to 90° C. and a kinematic viscosity of between about 0.1 cSt and 20 cSt at 100° C. according to ASTM D445 (or, for a wax having a density of 1 g/cm$^3$, dynamic viscosity between about 0.1 cP and 20 cP at 100° C.), wherein the temperature of the article at the time of applying is about 40° C. to 200° C., with the proviso that the temperature is not less than 30° C. below the melting temperature of the wax.

Also disclosed herein is a treated article comprising a water swellable article and a wax, the article comprising one or more biodegradable materials, edible materials, or biodegradable and edible materials, wherein the treated article is treated by applying a molten wax to the article, the wax having a melting point of about 50° C. to 90° C. and a kinematic viscosity of between about 0.1 cSt and 20 cSt at 100° C. according to ASTM D445 (or, for a wax having a density of 1 g/cm$^3$, dynamic viscosity between about 0.1 cP and 20 cP at 100° C.) wherein the temperature of the article at the time of applying is about 40° C. to 200° C., with the proviso that the temperature is not less than 10° C. below the melting temperature of the wax.

Also disclosed herein is a treated article, wherein the treated article is treated by applying a molten wax to the article, the article comprising one or more biodegradable materials, edible materials, or biodegradable and edible materials, the wax having a melting point between about 70° C. and 90° C. and a kinematic viscosity of between about 0.1 cSt and 20 cSt at 100° C. according to ASTM D445 (or, for a wax having a density of 1 g/cm$^3$, dynamic viscosity between about 0.1 cP and 20 cP at 100° C.), wherein the temperature of the article at the time of applying is at least the temperature of the melting point of the wax.

In some embodiments, the article is formed from materials that are inherently water swellable. In some such embodiments, the article is porous. In some such embodiments, the article is characterized by surface roughness. In some embodiments, the article is characterized by surface porosity, wherein the porosity is not throughout the article but rather proceeds through a portion thereof. In other embodiments, some or all of the pores extend through the article, such as through a thickness thereof. In some embodiments, the article is characterized by both surface roughness and porosity, wherein the porosity is through the entirety of the article or is a surface porosity. In some embodiments, the article includes one or more biologically derived materials, the biologically derived materials including cellulose, hemicellulose, lignin, starch, protein, or a combination of two or more of these; useful types of fibrous plant materials include cereal grain fiber components and fiber components from any commodity crop source. Examples of useful fibrous plant materials include corn husks, straw, wood chips, wood fiber, wood flour, soy flour adhesive, bagasse, seed hulls, hemp, cotton, switchgrass, miscanthus, as well as recycled versions thereof, and blends thereof. Straw materials include cereal grain straw such as wheat straw, oat straw, or another cereal straw. Wood fibers include hardwood and softwood fibers of any variety.

Described herein is a process for coating an article, the process comprising applying a molten wax to the article, the wax having a kinematic viscosity of between about 0.1 cSt to 20 cSt at 100° C., wherein the temperature of the article at the time of applying is about 40° C. to 200° C., with the proviso that the temperature is not less than 30° C. below the melting point of the wax; and cooling the article to a temperature below the melting point of the wax, wherein the surface of the article is characterized by at least one of surface roughness or porosity.

In some such embodiments, the wax has a melting point of about 60° C. to 90° C. In some such embodiments, the temperature of the article at the time of applying is about 40° C. to 110° C. In some such embodiments, the wax is about 15° C. to 50° C. above the melting point at the time of the applying. In some such embodiments, the wax is a paraffin wax. In some such embodiments, the melting point of the wax is about 70° C. to 80° C. In some such embodiments, the article comprises materials that are biodegradable, edible, or both biodegradable and edible. In some such embodiments, the article is water swellable. In some such embodiments, the wax is applied by dipping. In some such embodiments, the article is manufactured employing heat as an integral part of the manufacturing process, and the article is taken directly from the manufacturing step employing heat to an application area for applying the wax.

Also described herein is a process for making a container, the process comprising:

placing a fiber mixture in a mold, the fiber mixture comprising a fiber and a binder, the fiber and the binder being biodegradable, edible, or both;

forming a self-supporting container by application of heat and pressure to the fiber mixture in the mold, the container having an interior container surface and exterior container surface;

removing the container from the mold;

upon removing the container from the mold, applying a molten wax to the container, the wax having a kinematic viscosity of between about 0.1 cSt to 20 cSt at 100° C., wherein the temperature of the article at the time of applying is about 40° C. to 200° C., with the proviso that the temperature is not less than 30° C. below the melting point of the wax; and cooling the container to a temperature below the melting point of the wax.

In some such embodiments, the container fiber comprises straw, corn husks, sorghum stalks, soybean hulls, or peanut hulls, or a combination of two or more thereof. In some such embodiments, the binder comprises soy flour. In some such embodiments, the container is coated on at least a portion of the exterior surface thereof; in other such embodiments, the container is coated on both the interior and exterior surfaces thereof. In some such embodiments, swelling of the container in water is reduced by at least 25% compared to a container having a wax coating wherein the temperature of the container at the time of applying the wax is ambient temperature.

Also described herein is a container, the container having an exterior and interior defined by an exterior surface and an interior surface, the container comprising straw, corn husks, sorghum stalks, soybean hulls, peanut hulls, soy, soy, or a combination of two or more thereof and having a wax coating applied on at least a portion of the exterior surface thereof, wherein the temperature of the container at the time of applying is about 40° C. to 200° C., with the proviso that the temperature is not less than 30° C. below the melting point of the wax. In some embodiments, the wax has a melting point of about 70° C. to 90° C. and the temperature of the container at the time of applying is about 40° C. to 110° C., wherein the wax is applied by dipping the container in the wax. In some embodiments, the wax is about 15° C. to 30° C. above the melting point at the time of applying. In some embodiments, swelling of the container in water is reduced by at least 25% compared to a container having a wax coating wherein the temperature of the container at the time of applying the wax is ambient temperature.

Additional advantages and novel features of the invention will be set forth in part in the description that follows, and in part will become apparent to those skilled in the art upon examination of the following, or may be learned through routine experimentation upon practice of the invention.

BRIEF DESCRIPTION OF THE DRAWINGS

FIG. 1A-1D is a schematic representation of an article having rough surface features, wherein the surface is treated according to the methods of the invention.

FIG. 2A-2D is a schematic representation of an article having porous surface features, wherein the surface is treated according to the methods of the invention.

DETAILED DESCRIPTION

Figure 3:
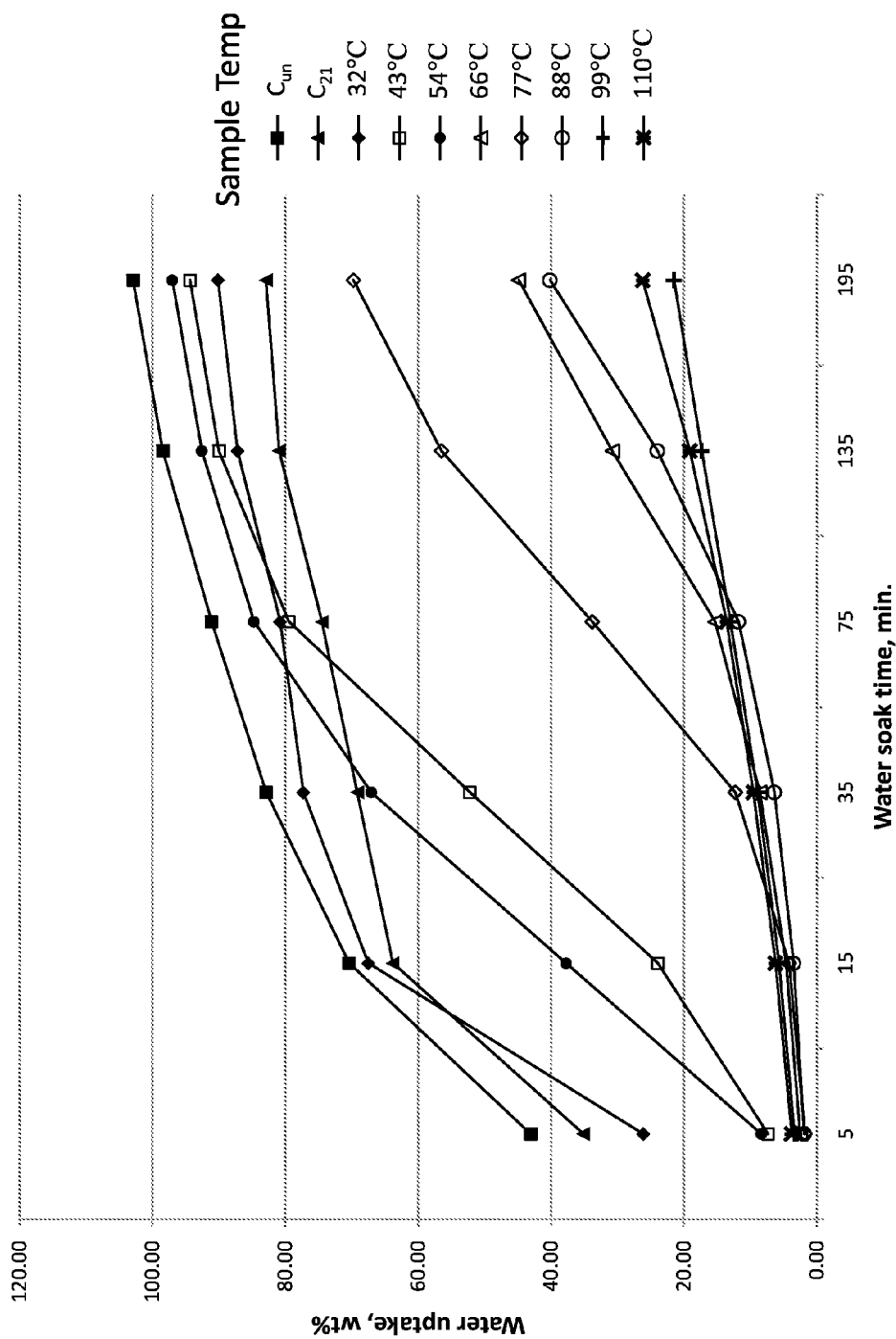
FIG. 3 is a graphical representation of water uptake as a function of soak time for samples treated according to the methods of the invention.

Various embodiments will be described in detail. Reference to various embodiments does not limit the scope of the claims attached hereto. Additionally, any examples set forth in this specification are not intended to be limiting and merely set forth some of the many possible embodiments for the appended claims.

The method involves applying a molten wax to an article, wherein the temperature of the article at the time the wax is applied to the article is about 40° C. to 200° C., with the proviso that the temperature of the article is not less than 30° C. below the melting temperature of the wax at the time of applying; and then cooling the article to a temperature sufficient to solidify the wax.

The conventional art describes wax incorporated within an article, for example by molding or forming an article and including the wax within the molding or forming composition itself, thereby incorporating the wax throughout the article; or treating a finished article by dipping or spraying an article at ambient temperature with molten wax. Incorporating wax within an article has two major drawbacks: first, a very large weight add-on is typically required in order to impart water resistance using such techniques; second, the amount required to gain water resistance is often sufficient to disrupt the cohesiveness of the article, for example, by preventing fibers from adhering in a nonwoven or pressed fibrous article.

As used herein, "ambient temperature" means less than about 30° C., typically about 15° C. to 25° C., and most typically about 18° C. to 23° C. or about 21° C. Dipping or spraying an ambient temperature article with a molten wax causes a thick, shell-like crust of wax to form on the surface; typically the crust lacks good adhesion to the surface, is easily disrupted, and often cracks open upon further cooling and contraction. Applying a thinner coat often results in a non-continuous layer of wax on the surface. Since wax is not polymeric, it lacks the cohesive strength to form a coating with good durability. In particular, where the coated surface has surface roughness, and/or the material from which the article is formed is water swellable, such coatings are highly unsatisfactory for improving water resistance. Surface roughness makes it less probable that a continuous coating is applied; the rougher the surface, the worse this problem becomes. Inherently water swellable materials are also hard to address because even a single, small coating defect that allows a tiny amount of liquid water to encroach will swell the underlying material, further disrupting the coating as the material absorbs water and the volume of the article increases.

We have found that the methods described herein are useful in conjunction with porous articles, articles having measurable surface roughness, articles formed from water absorptive materials, or articles having two or more of these properties, to impart significant water resistance thereto. Substantial improvement in water resistance is observed in articles treated using the methods of the invention, as measured by actual weight uptake upon immersion in water, when compared to articles coated by conventional methods.

As used herein, the terms "treated article" or "coated article" refer to an article that has a wax applied to it using a method of the present invention. Prior to applying the wax, the article is referred as an "article", "untreated article" or "water swellable article"; these terms are used interchangeably, as determined by context.

As used herein, the term "water swellable" and related terms used in context means a material or an article that increases in weight as a result of the uptake of liquid water. For example, where an article is contacted with liquid water (deionized water, distilled water, or tap water) and increases in weight as a result, the increase is reported as a percent based on the weight of the article prior to immersion. Thus, porosity, capillary uptake, water entrapment by rough surface features, and absorption can all contribute to what is measured herein as weight percent (wt %) uptake of water that is reported as "swelling." As used herein, the term "absorptive" or "water absorptive" means a material or article that increases in volume as a result of the uptake of liquid water. As used herein, "water resistant" is a relative term used to designate a reduction in water swellability; thus, increased water resistance means decreased water swellability.

Reduction in swelling, or increased water resistance, is calculated herein by determining weight percent of water uptake of the conventionally coated article, determining the weight percent of water uptake of the article treated using the method of the invention, and determining the arithmetic difference between the two percentages. Thus, if the conventionally coated article swells 150% in water at a selected temperature over a selected period of time, whereas the article treated using a method of the invention swells 40% in water at the same temperature and over the same amount of time, then the reduction in swelling is reported as an 110% reduction in swelling. Careful optimization results in at least a 25% reduction in swelling when compared to the same wax, coated conventionally and at similar or the same weight add-on amounts, and in some embodiments results in up to 200% reduction in swelling or more than 200% reduction in swelling. As used herein, "conventional" coating or application means wax applied by a selected technique, wherein the temperature of the article at the time of applying the wax is more than 30° C. below the melting point of the wax, or under 40° C., or both. Often a conventional coating means that the article at the time of applying the wax is ambient temperature (ambient temperature as defined elsewhere herein).

As used herein, the term "wax" means an organic compound or blend of compounds that melt at or above about 45° C. (113° F.), have a dynamic viscosity between about 0.1 cP and 20 cP in the melt, and are insoluble in water and lower ($C_1$-$C_3$) alcohols but soluble in organic, nonpolar solvents. As used herein and as applied to the wax, the term "melting point" means either a single melting point or, in the case of waxes that are blends of compounds, the highest point of the melting point range of the wax; or, in some embodiments, the congealing point or the highest point in the congealing range of the wax. In some embodiments, the melting point of the wax is about 45° C. to 90° C., for example about 45° C. to 85° C., or about 45° C. to 80° C., or about 45° C. to 75° C., or about 45° C. to 70° C., or about 45° C. to 65° C., or about 45° C. to 60° C., or about 45° C. to 55° C., or about 50° C. to 85° C., or about 55° C. to 90° C., or about 60° C. to 90° C., or about 65° C. to 90° C., or about 70° C. to 90° C., or about 75° C. to 90° C., or about 80° C. to 90° C., or about 85° C. to 90° C., or any temperature range intermediate between 45° C. and 90° C. in 5° C. increments. In some embodiments, the wax has a kinematic viscosity of about 0.1 cSt (centistokes) to 20 cSt at 100° C., according to ASTM D445, or about 1 cSt to 20 cSt, or about 2 cSt to 20 cSt, or about 3 cSt to 20 cSt, or about 4 cSt to 20 cSt, or about 5 cSt to 20 cSt, or about 0.1 cSt to 15 cSt, or about 0.1 cSt to 10 cSt at 100° C. according to ASTM D445. One of skill understands that dynamic viscosity in centipoise (cP) is obtained by knowing the kinematic viscosity and the density of the wax. Thus, a wax having a kinematic viscosity of 1 cSt at 100° C. and a density of 1 g/cm$^3$ has a dynamic viscosity of 1 cP.

In some embodiments, the wax includes one or more additives to increase thermal stability or light (typically UV) stability, or for some other purpose. In various embodiments, suitable additives include colorants, oils, petrolatum, crosslinkers, film formers, surfactants, biocides, and the like.

In embodiments, the temperature of the wax at the time of applying the wax to the article is not particularly limited, except that the wax must be at or above the melting point and below the smoke point (temperature where thermal degradation causes smoking) of the wax. In various embodiments, the wax is at the melting point to about 100° C. above the melting point, or about 5° C. to 100° C. above the melting point, or about 10° C. to 100° C. above the melting point, or about 15° C. to 100° C. above the melting point, or about 20° C. to 100° C. above the melting point, or about 25° C. to 100° C. above the melting point, or about 5° C. to 90° C. above the melting point, or about 5° C. to 80° C. above the melting point, or about 5° C. to 70° C. above the melting point, or about 5° C. to 60° C. above the melting point, or about 5° C. to 50° C. above the melting point, or about 5° C. to 5° C. above the melting point, or about 5° C. to 30° C. above the melting point in order to carry out the methods of the invention.

In some embodiments, the wax is synthetic; in other embodiments, the wax is a plant based wax or an animal based wax. In some embodiments, the wax is derived from biomass, such as a plant based wax, but is then chemically modified, such as by hydrogenation, dimerization, fluorination, and the like. In some embodiments, the wax is edible, biodegradable, or both edible and biodegradable. Suitable biomass derived waxes include plant and animal waxes such as beeswax, spermaceti, and lanolin; plant based waxes include carnauba wax, candelilla wax, ouricury wax, sugarcane wax, and retamo wax. Petroleum derived waxes include paraffin wax, montan wax, waxes derived from cracking of polyethylene, microcrystalline wax, Fischer-Tropsch waxes, and waxes derived from specialized catalytic polymerization of ethylene and propylene. In some embodiments, the wax is a blend of various types of compounds; this is most often true of biomass derived waxes. In some embodiments, for example paraffin wax, the wax is a blend of compounds that are chemically similar but are present in a range of molecular weights. In such embodiments, lower melting or higher melting fractions are selected for various applications as determined by an end user. In some embodiments, the plant based wax is a hydrogenated vegetable oil such as coconut oil, corn oil, cottonseed oil, olive oil, palm oil, peanut oil, rapeseed oil, safflower oil, sesame oil, soybean oil, sunflower oil or a combinations of two or more thereof. In some embodiments, the wax is a blend of two or more waxes, wherein the two or more waxes include any of those listed above. The type of wax employed in conjunction with the methods and articles of the invention is not particularly limited.

In embodiments, the temperature of the article at the time the wax is applied to the article is about 40° C. to 200° C., with the proviso that the temperature of the article is not less than 30° C. below the melting temperature of the wax at the time of applying. Thus, for example, an article to be treated with a wax that has a melting point of 50° C. is treated when the article is at a minimum temperature of 40° C.; an article to be treated with a wax that has a melting point of 90° C. is treated at a minimum temperature of 60° C. In some embodiments, the temperature of the article is about 30° C. below the melting temperature of the wax to 200° C. at the time of applying the molten wax to the article. In some embodiments, the temperature of the article, at the time of applying the molten wax to the article, is about 30° C. below the melt temperature of the wax to about the melt temperature of the wax, or about 20° C. below the melt temperature of the wax to about the melt temperature of the wax, or about 10° C. below the melt temperature of the wax to about the melt temperature of the wax, or about the melt temperature of the wax to about 50° C. above the melt temperature of the wax, or about the melt temperature of the wax to about 40° C. above the melt temperature of the wax, or about the melt temperature of the wax to about 30° C. above the melt temperature of the wax. In some embodiments, the temperature of the article, at the time of applying the molten wax to the article, is about 45° C. to 200° C., or about 45° C. to about 190° C., or about 45° C. to about 180° C., or about 45° C. to about 170° C., or about 45° C. to about 160° C., or about 45° C. to about 150° C., or about 45° C. to about 140° C., or about 45° C. to about 130° C., or about 45° C. to about 120° C., or about 45° C. to about 110° C., or about 45° C. to about 100° C., or about 50° C. to about 190° C., or about 60° C. to about 190° C., or about 70° C. to about 190° C., or about 80° C. to about 190° C., or about 90° C. to about 190° C., or about 100° C. to about 190° C. Various wax temperatures are suitably varied, along with the temperature of the article at the time of applying the wax to the article, to optimize the results of the method of the invention.

Optimal conditions of wax temperature and article temperature at the time the wax is applied will depend on the wax, but more importantly on the article: inherent tendency to absorb water, porosity, and surface roughness of the article are all important factors in determining the optimum temperatures of both wax and article employed to carry out the methods of the invention, but the effect on maximizing water resistance is more strongly associated with article temperature than with wax temperature. One of skill will appreciate that optimal temperature of both article and wax is determined by routine optimization.

Articles that are suitably treated include those made from water-swellable materials, where it is useful in one or more applications of the article to reduce or eliminate the swelling thereof. In some embodiments, the articles are formed from materials that are biodegradable, edible, or both biodegradable and edible. In some embodiments, the articles are formed from biopolymers and biomass derived materials. In some embodiments, the articles are formed from, or contain, inorganic porous or hydrophilic materials such as inorganic particulates including carbon, zeolite, calcium carbonate, and the like. In some embodiments the article is characterized by surface roughness.

In some embodiments, the article is a paper, a container, a disposable utensil, or a construction article. Papers include cardboard, paperboard, newspaper stock, construction paper, drawing paper or other art papers, printer paper, and the like including recycled materials including paper and papers having fiber blends with non-wood fibers, particulate fillers including pigments, or surface treatments. Containers include any article employed for the purpose of holding another article or group of articles; suitable containers include planters, comestible containers, storage containers, and the like. Disposable utensils include forks, knives, spoons, "sporks", serving utensils, and the like. Construction articles include boards, planks, rods, bricks, sheets or other items or members used for fabrication purposes.

The wax is suitably applied to an article by dipping, flooding, immersion, curtain coating, spraying, brushing, nip coating, slot coating, die coating, or any other industrially useful method. In some embodiments, the temperature of the wax is adjusted to provide a suitable temperature at the time of contact with the article; thus, when wax application is carried out by spraying or curtain coating, wax temperature is adjusted so that the appropriate temperature is reached at the point of contact with the article.

In order to carry out the methods of the invention, the article is brought to a temperature of about 40° C. to 200° C. prior to application of the wax. In some embodiments, the article is formed, stored at ambient temperatures, then preheated prior to application of the wax, such as in an oven, or by use of microwave radiation, infrared radiation, or another heating technique. In other embodiments, the article is heated just after manufacture thereof, wherein the wax application is carried out in-line with manufacturing and heating is carried out immediately prior to applying the wax, for example using one of the above mentioned techniques. In still other embodiments, the article is manufactured employing heat as an integral part of the manufacturing process, and the hot, just-manufactured article is advantageously employed in conjunction with wax application, for example by taking the article directly from the manufacturing step employing heat to an application area for the application of wax. This last embodiment is the most efficiently employed in terms of cost and use of resources, but requires careful optimization of manufacturing conditions to provide the optimal temperature of the article relative to the wax in order to achieve the desired result.

By applying molten wax to an article that does not cool the wax below its melt temperature, the wax is able to flow into and around uneven surface features and penetrate porous surfaces prior to solidifying. When the treated article is cooled, the wax is dispersed on the surface, and in some embodiments penetrates below the surface, such that water resistance is improved. Where the article is formed from a material that otherwise swells in water, and has rough surface features and/or is porous through at least a portion thereof from the surface into a thickness of the article, water resistance of the treated article is improved over the water resistance imparted by applying the same amount of the molten wax to an article where the article is coated when the article itself is at a temperature more than 30° C. below the melting point or melting point range of the wax. Additionally, the wax is easily dispersed in a thin coating where the wax is suitably applied by dipping the article in a bath of the molten wax. This occurs because the wax is not immediately solidified on the surface of the article, and excess wax drains away from the article once the article is removed from the bath. By adjusting the temperature of the article and the temperature of the wax bath, a suitable thin coating of wax is applied to the surface, coating individual surface roughness features or pore features without forming a thick crust over the top thereof. In some embodiments, where the article is a porous article, the wax penetrates beneath the surface according to capillary action that is dictated by the viscosity of the molten wax, the effective size of the pores, and the amount of time between the applying of the wax and the cooling thereof to below the melting temperature.

The fact that the treated articles of the invention have improved water resistance despite the absence of a visible, thick coating of wax over the surface of the article is counterintuitive. Thicker coatings are associated with better coverage according to intuition, yet here thinner coatings are associated with better coverage because individual features are in intimate contact with the coating rather than a thick, shell like coating that is defect prone and easily compromised.

Thus, one of skill will appreciate that a loose, porous structure such as a nonwoven article is easily coated throughout the thickness thereof employing the methods of the invention; smaller pores, thicker articles, or both will require immersion in molten wax for a period of time, for example, that is determined by one of skill by optimization in order to gain complete coating of all fibers therein. Nonporous articles having measurable surface roughness are also easily addressed by the methods of the invention, as the molten wax flows around surface features without forming a thick crust on top of the features.

Where the article is porous, lower viscosity causes increased penetration below the surface of the article. In embodiments where the wax is applied via dipping, for example, the amount of time the article spends contacting the wax bath is adjusted to provide the desired add-on amount of wax in embodiments where the article is porous or absorbs the wax. In other such embodiments where the article is not porous and does not absorb the wax, one of skill will understand that optimization is typically a matter of finding the minimum amount of time required to evenly impart the wax over the entire surface. It is an advantage of the invention that where the article is dipped in wax, for example, the article does not cause appreciable cooling of the wax and in some embodiments is actually above the temperature of the wax "bath" itself.

In some embodiments, by employing the methods of the invention, the article is coated throughout the thickness thereof with wax. In other embodiments, the surface only is coated with the wax. In still other embodiments, the surface of the article is coated and the wax further penetrates a portion of the thickness of an article. The amount of penetration of wax beneath the surface of the article is a function of the viscosity of the wax at the time of contact with the article, temperature of the wax at the time of contact, the temperature of the article at the time of contact, and the degree of porosity and average pore size of the article surface and beneath the surface where the wax penetrates or the tendency of the article to absorb the molten wax. One of skill will appreciate that for porous articles, the temperatures of the article and the wax bath are adjusted to provide the amount of penetration desired, and the method of application of the wax is selected to accommodate the amount of wax to be delivered to the surface of the article. It is an advantage of the invention that such results are readily optimized and no thick, crusty coating of wax on a surface is formed; rather, individual surface features, individual fibers, and the like are coated.

In some embodiments, by employing the methods of the invention, porous features present on or within an article are coated with wax on the surfaces surrounding the pores without filling the pores themselves; thus, porosity is retained while the tendency of the material itself to absorb water is curtailed or even prevented. Thus, in some embodiments a nonwoven layer or open, porous fibrous article is coated over individual fiber surfaces, yet the overall article retains porosity and thus breathability, for example, for purposes of air exchange.

In some embodiments, the surface of the article to be treated is rough. One measure of surface roughness is $R_a$, a one-dimensional parameter which quantifies roughness as an arithmetic average of peaks and valleys on a surface. It is a feature of the methods of the invention that surface roughness of nearly any dimension encountered in the articles listed herein is easily addressed using the methods set forth herein, wherein individual surface features are evenly and thoroughly coated without a thick crusty coating forming over the surface of the article. Even for very rough surface, such as particleboard or chipboard, the water resistance of the article treated by the methods disclosed herein is measurably improved over the water resistance of the same article treated with the same wax but having the wax applied to the article when the article is less than 30° C. below the melt temperature of the wax.

Examples of surfaces defined as "rough" include those having $R_a$ of at least about 1 µm, and as much as about 2 cm, or between about 5 µm and 1 cm, or about 25 µm and 1 cm, or about 50 µm and 1 cm, or about 100 µm and 1 cm, or about 1 mm and 1 cm, or about 5 mm and 1 cm, or about 1 mm and 2 cm. However, surface roughness in some embodiments is not limited to these parameters with respect to the observable effects of the methods of the invention; articles having greater and lesser surface roughness also benefit from the methods of the invention in terms of observed reduction in water swellability.

It is an advantage of the methods of the invention that rough, porous, or both rough and porous surfaces are easily and conveniently addressed by the wax treatments using the methods set forth herein. It is an advantage of the methods of the invention that water absorptive materials are easily and conveniently addressed by the methods of the invention to provide a noticeable increase in water resistance. The water resistance by articles that are porous, rough, water absorptive, or a combination of two or more such properties, treated using the methods disclosed herein is measurably improved over the water resistance of an identical article treated with the same wax but having the wax applied to the article when the article temperature is less than 30° C. below the melting temperature of the article.

Further, it is an advantage of the invention that in many embodiments, the amount of wax applied to the article is about the same, in terms of weight percent added, as is applied using conventional methods, wherein the method employed does not otherwise limit the amount of wax added. Thus, in e.g. curtain coating, dipping, or other such methods of adding wax to an article, the amount of wax taken up by the article is not particularly limited; whereas in spray or nip coating the amount of wax is metered. In the former case, e.g. dipping or curtain coating, we have found that the articles take up about the same amount of wax using the methods of the invention vs. conventional methods where the article is at ambient temperature at the time of applying. In some embodiments, the amount of wax added in such unmetered methods is ±about 0.1 wt % to 5 wt % based on the weight of the uncoated article; or ±about 1 wt % to 3 wt %, or ±about 2 wt % based on the weight of the uncoated article. One of skill will appreciate that the particular article, including nature of the surface roughness or porosity thereof, will dictate differences in weight pickup of wax. In many embodiments, the differences observed are no greater than the variability that arises from multiple trials of the same article treated using conventional methods.

Referring now to FIG. 1A-1D, FIG. 1A shows container 100. A portion of the surface cut away from container 100 as shown in FIG. 1A is shown on its side (in profile) and in magnified detail as 100A in FIG. 1B. Visible on section 100A of FIG. 1B are surface features 110. Surface features 110 cause container 100 of FIG. 1A to have a rough surface appearance and feel. FIG. 1C shows the same surface as 100A, dipped in a molten wax to form surface 100B. Surface 100B was formed while the container 100 was at ambient temperature, that is, less than 30° C. and often about 18° C.-21° C. Visible on surface 100B is the wax coating 120 present on surface features 110, wherein the wax coating 120 is solidified on the surface of features 110 but leaves air pockets 130. Thus, wax coating 120 of FIG. 1C does not coat the entirety of surface features 120 of surface 100B but only coats the tops thereof. In contrast to surface 100B of FIG. 1C, FIG. 1D shows the same surface as 100A, dipped in a molten wax to form surface 100C. Surface 100C was formed while the container 100 was at a temperature between 40° C. and 200° C. Visible on surface 100C is the wax coating 122 present on surface features 110, wherein the wax coating 122 is solidified over the entirety of the surface of features 11, leaving no air pockets. In some cases, the rough surface features 110 form a pocket that is filled with wax 140.

Referring now to FIG. 2A-2D, FIG. 2A shows board 200 cut to have a porous endgrain 201. A portion of the endgrain 201 surface cut away from board 200 as shown in FIG. 2A is shown on its side (in profile) and in magnified detail as 200A in FIG. 2B. Visible on section 200A of FIG. 2B is porous surface features 210 including pores 215 that proceed at least partway under the surface 210. FIG. 2C shows the same surface as 200A, dipped in a molten wax to form surface 200B. Surface 200B was formed while board 200 was at ambient temperature, that is, less than 30° C. and often about 18° C.-21° C. Visible on surface 200B is the wax coating 220 present on surface features 210, wherein the wax coating 220 is solidified on the surface of features 210 but leaves air pockets 230 within pores 215. Thus, wax coating 220 of FIG. 2C does not coat the entirety of pores 215 but only coats the surface 210 thereof. In contrast to surface 200B of FIG. 2C, FIG. 2D shows the same surface as 200A, dipped in a molten wax to form surface 200C. Surface 200C was formed while board 200 was at a temperature between 40° C. and 200° C. Visible on surface 200C is the wax coating 222 present on surface features 210, wherein the wax coating 222 is solidified over the entirety of pores 215, leaving no air pockets. In some cases, the pores 215 are filled with wax 240.

In some embodiments, the article to be treated is a biodegradable article, such as a compostable article, or an edible article. In some such embodiments, the article is a biodegradable container. Biodegradable containers are useful as planters for applications such as sprouting seeds, wherein at some time after the seed sprouts the planter can be planted in the soil directly and the plant's roots are able to traverse the container to reach the soil beyond; this in turn allows the faster breakdown of the container.

Biodegradable containers are also useful as single-use containers for livestock feed supplements. For example, CRYSTALYX® BIOBARREL®, produced by Ridley Inc. of Mankato, Minn. is a biodegradable container holding feed supplements for livestock. The container is formed from straw, wood fibers, and a soy-based adhesive. Thus, the container swells when exposed to liquid water. Further, the surface of the container is very rough and therefore difficult to coat with wax using conventional techniques. However, using the techniques of the present invention, the treated articles that result have substantially improved water resistance, such as between 25% and 200% reduction in swelling.

Certain examples will now be set forth in the Experimental Section. The examples are not intended to be limiting and merely set forth some of the many possible embodiments for the appended claims.

EXPERIMENTAL SECTION

Procedure 1: Treatment of Samples

BIOBARREL® containers were made using the procedure of Example 3 of Sun et al., U.S. Pat. No. 6,337,097 except that instead of straw fiber, a mixture of straw and aspen fibers were used at a 40:60 to 60:40 ratio; and the ratio of soy flour to fiber (straw plus wood) was between 15:85 and 25:75 by weight of the dry components.

Thin plywood, 0.125" (0.32 cm) thick, and thick plywood, 0.375" (0.95 cm) thick, were obtained from a local retailer of home improvement and construction products. Particle board, 0.625" (1.59 cm) thick was obtained from a local retailer of home improvement and construction products. Ceiling tile, 0.5" (1.25 cm) thick was Armstrong PP935A, obtained from Armstrong World Industries of Lancaster, Pa. Hardwood board, 0.5" (1.27 cm) thick was birch, obtained from a local retailer of home improvement and construction products. All samples were cut to 3"×3" (7.6 cm×7.6 cm) sections and each section was weighed.

Paraffin wax, IGI 1260A, was obtained from International Group, Inc. of Titusville, Pa. The wax was added to a vessel and heated to the selected temperature, wherein the volume of molten wax and the dimensions of the bath were sufficient to enable the sections to be immersed completely. For each test, four samples were heated to selected temperature by placing in a forced air oven set to the desired temperature for at least 30 minutes. The samples were removed one by one from the oven and immediately dipped in the wax bath for the minimum amount of time needed to immerse the sample, thus 1-2 seconds. The sample was then allowed to drain until liquid stopped flowing off the sample, and the sample was set on a clean hard surface table to cool at ambient temperature, measured to be 21° C. The samples were allowed to cool for at least about two hours.

After cooling, the samples were weighed again to determine weight uptake of wax. Weight percent of wax uptake is determined based on the weight of a sample prior to wax treatment, wherein the reported wt % wax add-on is the average of 4 samples.

Two types of Control samples were employed in various Examples. One set of four control samples was left untreated (not dipped in the wax bath); in water swelling tests these are referred to as $C_{un}$. One set of four control samples was dipped in the wax bath where the sample was 21° C. at the time of dipping; in wax uptake and water swelling tests these are referred to as $C_{21}$.

Procedure 2: Water Swelling Test.

Previously weighed samples were completely immersed in individual tubs of tap water equilibrated at ambient temperature, for the indicated period of time. Upon removal from the water, the sections were drained 5 minutes to to remove excess water, then immediately weighed. Weight of water uptake is reported herein as wt % water based on the weight of the dry sample treated with wax (or without wax treatment in the case of $C_{un}$ samples), wherein the reported wt % water uptake is the average of 4 samples.

Example 1

Samples of BIOBARREL® containers were treated according to Procedure 1, wherein the wax bath was set to the temperature indicated in Table 1. Wax uptake was measured for samples treated with wax at varying temperatures, as indicated in Table 1.

TABLE 1

Effect of BIOBARREL ® sample temperature on uptake of wax.

| Sample temperature, ° C. | Wax add-on, wt % | | | |
|---|---|---|---|---|
| | Wax @ 77° C. | Wax @ 88° C. | Wax @ 99° C. | Wax @ 110° C. |
| $C_{21}$ | 11.00 | 7.33 | 6.94 | 6.56 |
| 32 | 8.83 | 6.17 | 6.98 | 6.66 |

TABLE 1-continued

Effect of BIOBARREL ® sample temperature on uptake of wax.

| Sample temperature, °C. | Wax add-on, wt % | | | |
|---|---|---|---|---|
| | Wax @ 77° C. | Wax @ 88° C. | Wax @ 99° C. | Wax @ 110° C. |
| 43 | 6.85 | 6.88 | 7.00 | 7.88 |
| 54 | 7.00 | 7.19 | 7.90 | 6.89 |
| 66 | 9.25 | 7.84 | 7.94 | 7.89 |
| 77 | 7.66 | 6.47 | 8.23 | 8.73 |
| 88 | 8.41 | 7.79 | 8.56 | 8.57 |
| 99 | 8.52 | 7.46 | 8.38 | 8.01 |
| 110 | 9.72 | 8.68 | 7.85 | 6.95 |

The samples were soaked in water for 75 minutes according to Procedure 2, along with a set of $C_{un}$ samples of BIOBARREL®. The average weight uptake of water for the $C_{un}$ samples was 92.00 wt %.

TABLE 2

Weight percent water uptake of BIOBARREL ® samples after 75 minutes soak.

| Sample temp for wax treatment, °C. | Water uptake, wt % | | | | |
|---|---|---|---|---|---|
| | Wax @ 77° C. | Wax @ 88° C. | Wax @ 99° C. | Wax @ 110° C. | Average, all wax temps |
| $C_{21}$ | 74.47 | 80.85 | 79.36 | 45.85 | 70.13 |
| 32 | 80.76 | 69.54 | 78.00 | 43.01 | 67.83 |
| 43 | 79.43 | 55.13 | 27.57 | 24.03 | 46.54 |
| 54 | 84.70 | 35.52 | 12.24 | 8.60 | 35.27 |
| 66 | 15.30 | 12.31 | 13.27 | 12.59 | 13.37 |
| 77 | 33.78 | 8.71 | 14.19 | 12.38 | 17.26 |
| 88 | 11.77 | 11.77 | 12.06 | 13.70 | 12.32 |
| 99 | 12.97 | 12.31 | 12.85 | 12.83 | 12.74 |
| 110 | 13.54 | 12.77 | 14.41 | 12.60 | 13.33 |

Example 2

BIOBARREL® samples were treated according to Procedure 1, wherein the wax bath was set to 77° C. Sample temperatures used for wax treatment were varied as indicated in Table 3. Five sets of 4 samples were treated with wax at each sample temperature. Then each set of 4 samples plus one set of $C_{un}$ samples was soaked in water according to Procedure 2, wherein the soak time was varied according to Table 3. The data is represented graphically in FIG. 3.

TABLE 3

Water uptake of BIOBARREL ® samples at variable soak times, as a function of sample temperature during wax treatment, with wax temperature of 77° C.

| Sample temp for wax treatment, °C. | Water uptake, wt % | | | | |
|---|---|---|---|---|---|
| | Soak 5 min. | Soak 15 min. | Soak 35 min. | Soak 75 min. | Soak 195 min. |
| $C_{un}$ | 43.05 | 70.38 | 82.85 | 91.08 | 98.41 |
| $C_{21}$ | 35.10 | 63.81 | 69.16 | 74.47 | 80.92 |
| 32 | 26.09 | 67.48 | 77.26 | 80.76 | 87.16 |
| 43 | 7.34 | 23.91 | 52.18 | 79.43 | 89.98 |
| 54 | 8.33 | 37.72 | 67.04 | 84.70 | 92.56 |
| 66 | 2.48 | 4.59 | 8.56 | 15.30 | 30.77 |
| 77 | 1.76 | 4.14 | 12.24 | 33.78 | 56.46 |
| 88 | 1.88 | 3.48 | 6.36 | 11.77 | 23.96 |
| 99 | 3.33 | 5.65 | 8.85 | 12.97 | 17.30 |
| 110 | 3.76 | 6.19 | 9.50 | 13.54 | 19.09 |

Example 3

Thin plywood samples were treated according to Procedure 1, wherein the wax bath was set to the temperature indicated in Table 4. Then the samples were soaked in water for 120 minutes according to Procedure 2. The weight percent of water uptake of the samples is shown in Table 4.

TABLE 4

Water uptake of thin plywood after 2 hours soak time, as a function of sample temperature and wax temperature during wax treatment.

| Sample temp for wax treatment, °C. | Water uptake, wt % | | |
|---|---|---|---|
| | Wax @ 77° C. | Wax @ 99° C. | Average, all wax temps |
| $C_{21}$ | 17.31 | 11.23 | 14.27 |
| 43 | 13.68 | 11.86 | 12.77 |
| 66 | 13.44 | 18.59 | 16.02 |
| 99 | 19.97 | 14.49 | 17.23 |
| 110 | 13.07 | 16.01 | 14.54 |

Example 4

The procedure of Example 3 was repeated except with thick plywood samples. The weight percent of water uptake of the samples is shown in Table 5.

TABLE 5

Water uptake of thick plywood after 2 hours soak time, as a function of sample temperature and wax temperature during wax treatment.

| Sample temp for wax treatment, °C. | Water uptake, wt % | | |
|---|---|---|---|
| | Wax @ 77° C. | Wax @ 99° C. | Average, all wax temps |
| $C_{21}$ | 9.82 | 5.54 | 7.68 |
| 43 | 7.35 | 7.38 | 7.37 |
| 66 | 6.64 | 5.58 | 6.11 |
| 99 | 6.51 | 5.93 | 6.22 |
| 110 | 6.72 | 6.82 | 6.77 |

Example 5

Figure 4:
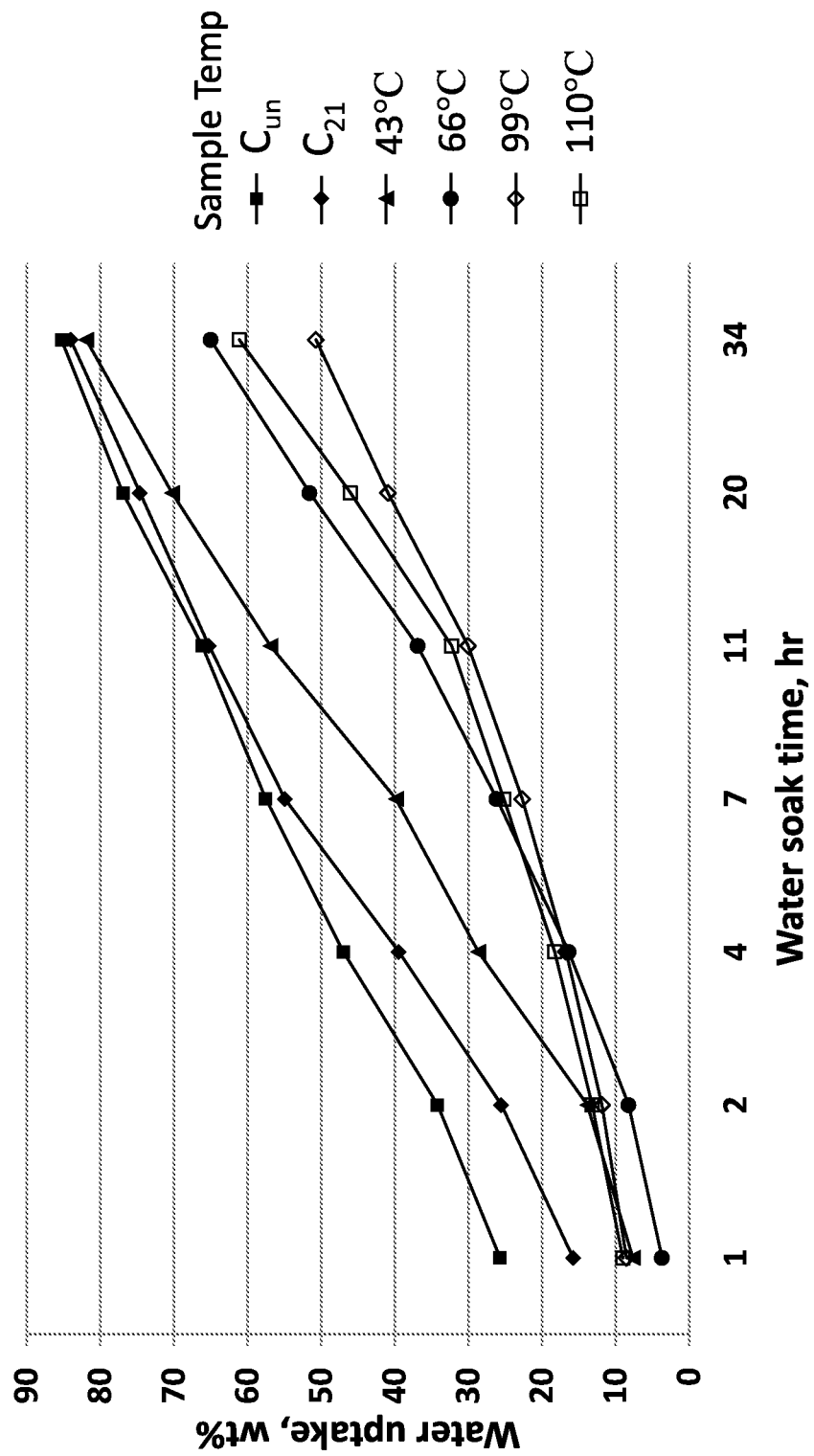
FIG. 4 is a graphical representation of water uptake as a function of soak time for samples treated according to the methods of the invention.

Thin plywood samples were treated according to Procedure 1, wherein the wax bath was set to 77° C. Sample temperatures used for wax treatment were varied as indicated in Table 6. Seven sets of 4 samples were treated with wax at each sample temperature. Then each set of 4 samples plus one set of $C_{un}$ plywood samples was soaked in water according to Procedure 2, wherein the soak time was varied according to Table 6. The data is represented graphically in FIG. 4.

TABLE 6

Water uptake of thin plywood at variable soak times, as a function of sample temperature during wax treatment, with wax temperature of 77° C.

| Sample temp for wax treatment, °C. | Water uptake, wt % | | | | | | |
|---|---|---|---|---|---|---|---|
| | Soak 1 hr | Soak 2 hr | Soak 4 hr | Soak 7 hr | Soak 11 hr | Soak 20 hr | Soak 34 hr |
| $C_{un}$ | 25.69 | 34.19 | 46.95 | 57.52 | 66.11 | 76.91 | 85.23 |
| $C_{21}$ | 15.76 | 25.53 | 39.44 | 54.92 | 65.23 | 74.59 | 83.98 |

TABLE 6-continued

Water uptake of thin plywood at variable soak times, as a function of sample temperature during wax treatment, with wax temperature of 77° C.

| Sample temp for wax treatment, ° C. | Water uptake, wt % | | | | | | |
|---|---|---|---|---|---|---|---|
| | Soak 1 hr | Soak 2 hr | Soak 4 hr | Soak 7 hr | Soak 11 hr | Soak 20 hr | Soak 34 hr |
| 43 | 7.65 | 13.84 | 28.65 | 39.83 | 56.88 | 70.25 | 81.87 |
| 66 | 3.70 | 8.24 | 16.36 | 26.16 | 36.87 | 51.56 | 64.99 |
| 99 | 8.52 | 11.83 | 16.73 | 22.68 | 30.03 | 40.91 | 50.69 |
| 110 | 9.00 | 13.18 | 18.27 | 25.17 | 32.27 | 46.01 | 61.08 |

Example 6

The procedure of Example 5 was repeated except with thick plywood samples. The weight percent of water uptake of the samples is shown in Table 7.

TABLE 7

Water uptake of thick plywood at variable soak times, as a function of sample temperature during wax treatment, with wax temperature of 77° C.

| Sample temp for wax treatment, ° C. | Water uptake, wt % | | | | | | |
|---|---|---|---|---|---|---|---|
| | Soak 1 hr | Soak 2 hr | Soak 4 hr | Soak 7 hr | Soak 11 hr | Soak 20 hr | Soak 34 hr |
| $C_{un}$ | 11.87 | 16.37 | 22.14 | 28.01 | 34.62 | 42.27 | 55.00 |
| $C_{21}$ | 4.79 | 9.47 | 17.00 | 31.45 | 42.78 | 54.23 | 64.11 |
| 43 | 3.03 | 5.13 | 9.01 | 20.86 | 36.45 | 55.65 | 72.07 |
| 66 | 1.98 | 3.90 | 7.35 | 14.53 | 24.23 | 45.75 | 66.58 |
| 99 | 3.61 | 5.96 | 9.44 | 16.10 | 27.79 | 46.49 | 57.21 |
| 110 | 4.72 | 7.59 | 11.39 | 18.41 | 31.89 | 50.20 | 65.29 |

Example 7

Figure 5:
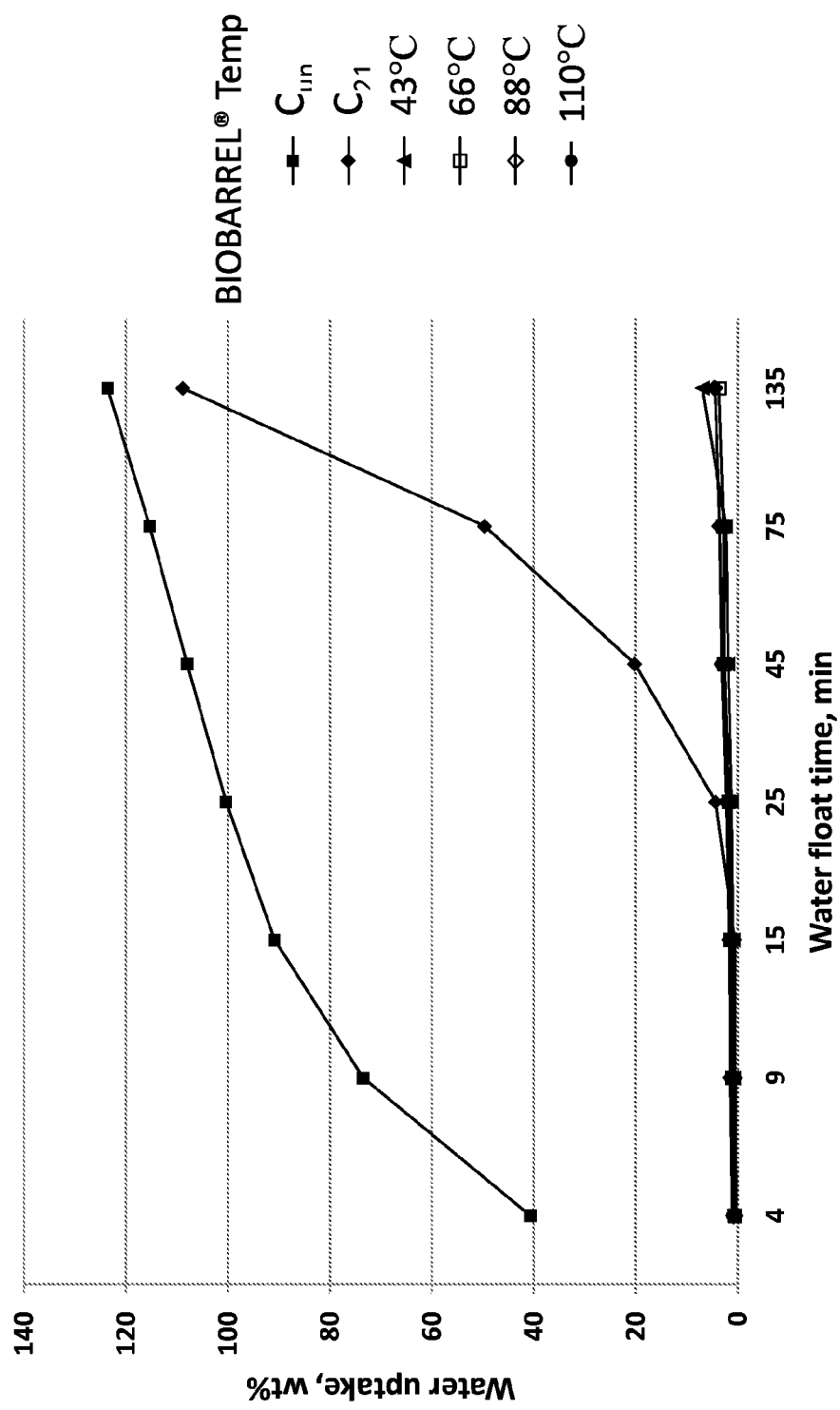
FIG. 5 is a graphical representation of water uptake as a function of flotation time for BIOBARREL® containers treated according to the methods of the invention.

Whole BIOBARRELS® were coated with wax using Procedure 1, wherein the wax temperature was set at 99° C. The BIOBARRELS® were immersed in the wax so as to coat only the sides and bottom, so that the wax did not get on the inside surfaces of the BIOBARRELS®. BIOBARREL® temperatures used for wax treatment were varied as indicated in Table 8. Seven sets of 4 BIOBARRELS® were treated with wax at each BIOBARREL® temperature. Then each set of 4 wax treated BIOBARRELS® plus one set of $C_{un}$ BIOBARRELS® were set in a tub of tap water where the water was about 10 cm deep and the containers floated on top of the water; flotation time was varied according to Table 8. The data is represented graphically in FIG. 5.

TABLE 8

Water uptake of BIOBARRELS ® at variable soak times, as a function of sample temperature during wax treatment, with wax temperature of 99° C.

| Sample temp for wax treatment, ° C. | Water uptake, wt % | | | | | | |
|---|---|---|---|---|---|---|---|
| | Float 4 min | Float 9 min | Float 15 min | Float 25 min | Float 45 min | Float 75 min | Float 135 min |
| $C_{un}$ | 38.38 | 69.08 | 87.70 | 100.21 | 110.17 | 118.91 | 122.83 |
| $C_{21}$ | 31.40 | 42.82 | 60.95 | 91.53 | 109.74 | 119.46 | 125.38 |
| 43 | 4.45 | 11.13 | 19.64 | 34.34 | 62.49 | 82.53 | 93.54 |
| 66 | 3.88 | 7.72 | 10.72 | 14.11 | 19.19 | 25.05 | 35.28 |
| 88 | 2.18 | 3.89 | 5.36 | 7.03 | 9.82 | 13.52 | 19.98 |
| 110 | 9.83 | 10.56 | 12.40 | 14.27 | 17.56 | 22.11 | 28.79 |

Example 8

Particleboard samples were treated according to Procedure 1, wherein the wax bath was set to 77° C. Sample temperatures used for wax treatment were varied as indicated in Table 9. Three sets of 4 samples were treated with wax at each sample temperature. Then each set of 4 samples plus one set of $C_{un}$ particleboard samples was soaked in water according to Procedure 2, wherein the soak time was varied according to Table 9.

TABLE 9

Water uptake of particleboard at variable soak times, as a function of sample temperature during wax treatment, with wax temperature of 77° C.

| Sample temp for wax treatment, ° C. | Water uptake, wt % | | |
|---|---|---|---|
| | Soak 1 hr | Soak 2 hr | Soak 3 hr |
| $C_{un}$ | 5.58 | 9.92 | 14.74 |
| $C_{21}$ | 1.20 | 5.16 | 14.62 |
| 43 | 0.44 | 2.37 | 4.55 |
| 66 | 0.76 | 2.49 | 5.62 |
| 88 | 3.07 | 5.53 | 8.85 |
| 110 | 2.82 | 5.74 | 9.42 |

Example 9

Hardboard samples were treated according to Procedure 1, wherein the wax bath was set to 77° C. for some samples and 99° C. for other samples. Sample temperatures used for wax treatment were varied as indicated in Table 10. Five sets of 4 samples were treated with wax at each sample temperature and for each wax bath temperature. Wax uptake was measured as a weight percent of the sample prior to wax treatment. Results are shown in Table 10. Notably, wax pickup decreased significantly with increasing sample temperature.

TABLE 10

Wax uptake of hardwood samples as a function of sample temperature, where the wax bath was set to 77° C. and 99° C.

| Sample temperature, ° C. | Wax Uptake, wt % | |
|---|---|---|
| | Wax @ 77° C. | Wax @ 99° C. |
| $C_{21}$ | 11.94 | 5.92 |
| 43 | 12.60 | 6.51 |
| 66 | 7.38 | 3.52 |
| 88 | 2.39 | 2.73 |
| 110 | 2.86 | 1.50 |

Then each set of 4 samples plus one set of $C_{un}$ hardboard samples was soaked in water according to Procedure 2, wherein the soak time was varied according to Tables 11 and 12.

TABLE 11

Water uptake of hardwood samples at variable soak times, as a function of sample temperature during wax treatment, with wax temperature of 77° C.

| Sample temp for wax treatment, °C. | Water uptake, wt % for Wax Temp. 77° C. | | | | |
|---|---|---|---|---|---|
| | Soak 30 min. | Soak 75 min. | Soak 165 min. | Soak 420 min. | Soak 1320 min. |
| $C_{un}$ | 30.86 | 40.08 | 46.35 | 52.58 | 60.97 |
| $C_{21}$ | 26.34 | 37.28 | 43.41 | 49.86 | 57.81 |
| 43 | 6.54 | 14.50 | 22.96 | 35.11 | 49.07 |
| 66 | 3.70 | 7.51 | 13.52 | 27.27 | 41.85 |
| 88 | 7.80 | 12.65 | 18.45 | 27.19 | 40.41 |
| 110 | 8.37 | 13.78 | 19.64 | 28.44 | 42.82 |

TABLE 12

Water uptake of hardwood samples at variable soak times, as a function of sample temperature during wax treatment, with wax temperature of 99° C.

| Sample temp for wax treatment, °C. | Water uptake, wt % for Wax Temp. 99° C. | | | | |
|---|---|---|---|---|---|
| | Soak 30 min. | Soak 75 min. | Soak 165 min. | Soak 420 min. | Soak 1320 min. |
| $C_{un}$ | 30.86 | 40.08 | 46.35 | 52.58 | 60.97 |
| $C_{21}$ | 0.32 | 5.27 | 10.11 | 21.43 | 35.76 |
| 43 | 3.98 | 6.75 | 11.21 | 22.73 | 36.25 |
| 66 | 6.25 | 9.57 | 14.34 | 23.19 | 37.28 |
| 88 | 6.56 | 11.04 | 18.15 | 31.30 | 45.82 |
| 110 | 7.61 | 12.66 | 18.63 | 28.54 | 43.07 |

Example 10

The procedure of Example 9 was repeated except with ceiling tile samples instead of hardwood. Due to the large increase in wax pickup for the samples treated with the wax bath set to 77° C., the water soak was not reported. The water soak is reported only for the samples treated using the wax bath set to 210° C. Wax pickup is shown in Table 13, water soak results are shown in Table 14.

TABLE 13

Wax uptake of ceiling tile samples as a function of sample temperature, where the wax bath was set to 77° C. and 99° C.

| Sample temperature, °C. | Wax Uptake, wt % | |
|---|---|---|
| | Wax @ 77° C. | Wax @ 99° C. |
| $C_{21}$ | 28.5 | 67.3 |
| 43 | 31.1 | 72.2 |
| 66 | 53.8 | 77.4 |
| 88 | 80.2 | 77.5 |
| 110 | 78.1 | 84.7 |

TABLE 14

Water uptake of ceiling tile samples at variable soak times, as a function of sample temperature during wax treatment, with wax temperature of 99° C.

| Sample temp for wax treatment, °C. | Water uptake, wt % for Wax Temp. 99° C. | | | | |
|---|---|---|---|---|---|
| | Soak 5 min. | Soak 9 min. | Soak 15 min. | Soak 75 min. | Soak 345 min. |
| $C_{un}$ | 249.8 | 263.3 | 266.9 | 271.2 | 275.0 |
| $C_{21}$ | 99.4 | 126.8 | 128.9 | 134.9 | 143.8 |
| 43 | 84.5 | 102.4 | 105.8 | 113.8 | 120.4 |
| 66 | 43.4 | 60.1 | 62.6 | 67.2 | 74.4 |
| 88 | 16.4 | 37.0 | 39.0 | 45.1 | 50.8 |
| 110 | 23.5 | 34.7 | 37.1 | 43.3 | 49.9 |

The invention illustratively disclosed herein can be suitably practiced in the absence of any element which is not specifically disclosed herein. While the invention is susceptible to various modifications and alternative forms, specifics thereof have been shown by way of examples, and are described in detail. It should be understood, however, that the invention is not limited to the particular embodiments described. On the contrary, the intention is to cover modifications, equivalents, and alternatives falling within the spirit and scope of the invention. In various embodiments, the invention suitably comprises, consists essentially of, or consists of the elements described herein and claimed according to the claims.

Although the present disclosure provides references to preferred embodiments, persons skilled in the art will recognize that changes may be made in form and detail without departing from the spirit and scope of the invention.

What is claimed is:

1. A process for making a container, the process comprising:
    placing a fiber mixture in a mold, the fiber mixture comprising a fiber and a binder, the fiber and the binder being biodegradable, edible, or both;
    forming a self-supporting container by application of heat and pressure to the fiber mixture in the mold, the container having an interior container surface and exterior container surface;
    removing the container from the mold;
    upon removing the container from the mold, applying a molten wax to the container, the wax having a kinematic viscosity of between about 0.1 cSt to 20 cSt at 100° C., wherein the temperature of the container at the time of applying is about 40° C. to 200° C., with the proviso that the temperature is not less than 30° C. below the melting point of the wax; and
    cooling the container to a temperature below the melting point of the wax.

2. The process of claim 1 wherein the fiber comprises wood fiber, straw, corn husks, sorghum stalks, soybean hulls, peanut hulls, or a combination of two or more thereof.

3. The process of claim 1 wherein the binder comprises soy flour.

4. The process of claim 1 wherein the container is coated on at least a portion of the exterior surface thereof.

5. The process of claim 1 wherein the container is coated on both the interior and exterior surfaces thereof.

6. The process of claim 4 wherein swelling of the container in water is reduced by at least 25% compared to a container having a wax coating wherein the temperature of the container at the time of applying the wax is ambient temperature.

7. The process of claim 1 further comprising bringing the container to the temperature of about 40° C. to 200° C. by pre-heating the container in an oven, by use of microwave radiation, or by use of infrared radiation.

8. The process of claim 1 wherein the temperature of the container at the time of applying is about 50° C. to 190° C., with the proviso that the temperature is not less than 20° C. below the melting point of the wax.

9. The process of claim 1 wherein the melting point of the wax is from 55° C. to 90° C.

10. The process of claim 1 further comprising pre-heating the wax to a temperature that is about 5° C. to 50° C. above the melting point of the wax at the time of the applying.

11. The process of claim 1 further comprising pre-heating the wax to a temperature that is about 15° C. to 30° C. above the melting point of the wax at the time of the applying.

12. The process of claim 1 wherein the applying comprises dipping the container in the molten wax.

13. The process of claim 1 wherein the applying comprises curtain coating the container with the molten wax.

14. The process of claim 1 wherein the container has a surface roughness $R_a$ of from 1 μm to 2 cm before the applying.

* * * * *